(12) United States Patent
Delcher

(10) Patent No.: US 9,366,284 B2
(45) Date of Patent: Jun. 14, 2016

(54) DOUBLE-ACTING LOCKWASHER

(75) Inventor: Christophe Delcher, Fraisses (FR)

(73) Assignee: Nord-Locke International AB, Gothenburg (SE)

( * ) Notice: Subject to any disclaimer, the term of this patent is extended or adjusted under 35 U.S.C. 154(b) by 257 days.

(21) Appl. No.: 13/805,191

(22) PCT Filed: Jun. 24, 2011

(86) PCT No.: PCT/FR2011/051459
§ 371 (c)(1),
(2), (4) Date: Mar. 15, 2013

(87) PCT Pub. No.: WO2011/161387
PCT Pub. Date: Dec. 29, 2011

(65) Prior Publication Data
US 2013/0243544 A1    Sep. 19, 2013

(30) Foreign Application Priority Data

Jun. 25, 2010 (FR) .................................. 10 55098

(51) Int. Cl.
*F16B 39/24* (2006.01)
*F16B 39/282* (2006.01)

(52) U.S. Cl.
CPC .............. *F16B 39/24* (2013.01); *F16B 39/282* (2013.01)

(58) Field of Classification Search
CPC ............................... F16B 39/24; F16B 39/282
USPC .......... 411/136, 154, 161, 544, 545, 953, 943
IPC ..................................................... F16B 39/21
See application file for complete search history.

(56) References Cited

U.S. PATENT DOCUMENTS 2,124,249 A * 7/1938 Guiducci ....................... 411/114
3,077,218 A * 2/1963 Ziegler ........................... 411/155

(Continued)

FOREIGN PATENT DOCUMENTS

CN            1042399        5/1990
CN         201496380 U      6/2010

(Continued)

OTHER PUBLICATIONS

International Search Report from corresponding International Application No. PCT/FR2011/051459, mailed on Sep. 28, 2011.

(Continued)

*Primary Examiner* — Gary Estremsky
(74) *Attorney, Agent, or Firm* — Renner, Otto, Boisselle & Sklar, LLP

(57) ABSTRACT

The invention relates to a locking washer which is to be inserted between a bearing element (38) and a screwable element (42) and which includes two washer crowns (12, 14), each of which has an engagement face (22, 24). Said washer crowns (12, 14) which engage with one another and are maintained compressed under axial pressure between said screwable element (42) and said bearing element (38) are capable, when said screwable element is unscrewed, of rotatably engaging with said screwable element (42), and said bearing element (38), respectively, so as to rotate said washer crowns (12, 14) relative to one another, in order to rotatably lock said screwable element (42). According to the invention, said locking washer presents a shape of a truncated cone, and said locking washer (10) is elastically deformable in order to be able to be flattened, forming a spring, such that said axial pressure is maintained substantially constant.

11 Claims, 1 Drawing Sheet

(56) References Cited

U.S. PATENT DOCUMENTS

| | | | |
|---|---|---|---|
| 3,417,802 A | 12/1968 | Oldenkott | |
| 4,020,734 A * | 5/1977 | Bell | 411/10 |
| 4,103,725 A * | 8/1978 | Abe | 411/160 |
| 4,589,797 A * | 5/1986 | Martins | 403/372 |
| 5,011,351 A * | 4/1991 | Terry | 411/144 |
| 5,090,855 A * | 2/1992 | Terry | 411/144 |
| 5,409,338 A * | 4/1995 | McKinlay | 411/149 |
| 5,626,449 A * | 5/1997 | McKinlay | 411/149 |
| 5,829,933 A * | 11/1998 | Kramer | 411/156 |
| 6,347,915 B1 * | 2/2002 | Balzano | 411/149 |
| 6,896,465 B2 * | 5/2005 | Andersson | 411/533 |
| 7,261,506 B2 * | 8/2007 | Smolarek | 411/161 |

FOREIGN PATENT DOCUMENTS

| | | |
|---|---|---|
| EP | 0131556 A1 | 1/1985 |
| FR | 767903 | 7/1934 |
| GB | 514923 | 5/1938 |
| GB | 514923 | 11/1939 |
| GB | 2136077 A | 9/1984 |
| JP | S51-4446 | 1/1976 |
| JP | S55115421 U | 8/1980 |
| JP | S60-190846 | 12/1985 |
| JP | S6297314 U | 6/1987 |
| JP | 2003-526057 | 9/2003 |
| JP | 2003526057 A | 9/2003 |
| JP | 2006-258275 | 9/2006 |
| WO | 01/66964 | 9/2001 |
| WO | 0166964 | 9/2001 |

OTHER PUBLICATIONS

Office Action translation for corresponding Japanese Application No. 2013-515948 mailed Mar. 9, 2015.
Third Office Action and Search Report translation corresponding to Chinese Application No. 201180031296.8 dated Nov. 11, 2015.
Office Action translation for corresponding Japanese Application No. 2013-515948 dated Nov. 30, 2015.

* cited by examiner

DOUBLE-ACTING LOCKWASHER

The present invention relates to a locking washer by which a screw/nut system can be maintained locked against rotation after it has been tightened.

The known locking washers are made for instance from an elastic truncated ring substantially deformed to the effect that the two free extremities of the ring form beaks. The ring is thus intended for coming into engagement between for instance a bearing element and a nut, while a screw shank extends protrudingly from the bearing element and through the elastic ring. During tightening of the nut, the elastic ring is flattened between the bearing element and the nut, while the beaks of the ring become respectively embedded therein to thereby form a brake.

Such locking washers are relatively simple, but their efficiency is modest.

Other, more complex locking washers comprise two washer crowns applied coaxially against each other, and they are adapted to engage between the bearing element and the nut. They each have an engagement face and an opposite, ribbed bearing face. The engagement face as such has asymmetrical radial teeth, and the asymmetrical radial teeth have, on the one hand, a crest and a tooth bottom spaced angularly from the crest at an angle being, substantially, smaller than about 60°, and, on the other hand, two opposed sides. The one of the sides is substantially inclined relative to the median plane defined by the washer crown, and it extends angularly between the crest and the tooth bottom. It is intended to form a sliding side. The other side is substantially perpendicular to the inclined side of the following tooth, and it constitutes a stop side. Thus, the engagement faces of the washer crowns are intended for being applied against each other, such that, on the one hand, the inclined sliding sides come into contact with each other, respectively, and, on the other hand, the stop sides come into abutment on each other, respectively.

Also, when the nut is tightened, the locking washer is held in a vise-grip between the bearing element and the nut, and the engagement faces are then brought along axially against each other under pressure. In turn, when the nut tends to loosen, it brings along the washer crown against which it bears in rotation, and consequently the sliding sides of that washer crown are brought along slidingly against the sliding sides of the other washer crown, while forming a ramp. In this manner, the washer crowns are separated axially from each other, and the axial tension which is exercised in the screw/nut system increases significantly. Due to that, the friction forces generated in the screw/nut system increase considerably and bring about the locking of the nut against rotation. More specifically, the sliding side is inclined relative to the axis of the screw/nut system at an angle greater than that of the helix angle of the system. Also, at the moment when the nut brings the washer crown into rotation when it loosens, the latter is brought along axially against it, and locks it by wedge effect.

This type of washer which is described in particular in EP 0131556 is, however, associated with certain drawbacks.

Actually this type of washer is effective inasmuch as the washer crown engages with the nut when it loosens and that applies in all circumstances. Yet, over time and according to implementation conditions, a screw/nut system including a bearing element has a propensity to loosen. This phenomenon is brought about either by the screw sliding against the washer crown or by a flowing and/or a relaxation of the elements affected by the tightening forces. In those two cases, the two crowns are not brought along in rotation relative to one another, and the axial tension does not increase—rather the contrary, it drops. Consequently the locking of the nut becomes ineffective.

Also, a problem that arises and which the present invention is aimed at solving is to provide a locking washer which can be more effective in all circumstances, no matter the conditions of implementation and environment.

To this end, the present invention proposes a locking washer intended for being compressed axially between a bearing element and a screwable element, said screwable element being connected to said bearing element by a shank member suitable for traversing said locking washer, wherein said locking washer comprises two washer crowns having each an engagement face, which engagement face has a plurality of asymmetrical radial teeth, each of said asymmetrical, radial teeth having, on the one hand, a crest and a tooth bottom spaced angularly apart from said crest, and, on the other hand, a sliding side which is inclined and extends angularly between said crest and said tooth bottom, wherein the engagement faces of said washer crowns are suitable for being applied against each other, whereas the sliding sides come into contact with each other, respectively, said washer crowns, which are applied against each other and maintained compressed under axial pressure between the screwable element and the bearing element, being suitable for being brought along in rotation with the screwable element and the bearing element, respectively, when the screwable element loosens, so that the washer crowns are caused to rotate relative to each other, whereas the respective sides are brought along slidingly against each other, respectively, while forming a ramp, to separate axially the washer crowns from each other to bring about the locking against rotation of the screwable element. According to the invention, the locking washer has a shape of a truncated cone; and it is elastically deformable in order to be able to be flattened while forming a spring between the bearing element and the screwable element to maintain the axial pressure substantially constant, whereby the washer crowns are suitable for being brought along in rotation relative to each other when the bearing element and the screwable element separate axially from each other.

Thus, it is a characteristic feature of the invention to provide two conical washer crowns made of a material which is elastically deformable and which are engaged in one another. In this manner, when the two crowns are deformed to a flattened state between the bearing element and the screwable element, e.g. a nut, they respectively exert an axial pressure against the bearing element and against the screwable element. When, for any reason whatsoever, the nut separates axially from the bearing element, the two crowns will then, by spring effect, have a tendency to revert to their initial conical shape and will continue to exercise, respectively, the axial pressure against the screw and the bearing element. Consequently, when the nut tends to loosen in this position in which it is separated from the bearing element, the washer crowns stay in rotational engagement with the nut and the bearing element, respectively. Also, they are brought along in rotation relative to each other, and the locking effect is generated. Thus, as will be explained in further detail in the description that follows, the angle having the greatest slope relative to the median plane of the washer is greater than the helix angle of the screwable element in order to bring about the locking.

In order for the washer crowns to be able to enter into engagement with the nut and with the bearing portion, respectively, it is necessary that the friction forces between those elements are considerable, and consequently that the same applies to the axial pressure. To a certain extent, the bearing support portions of the washer crowns opposite their engagement face stay in contact with the bearing element and the screwable element, respectively, across a major part of their surfaces. Owing to the taper ratio of the locking washer according to the present invention, this axial pressure remains and its efficiency is constant over time. Consequently, there is no need to provide radial striations on the bearing support portions of the washer crowns which will tend to damage the nut, but also and most importantly, the bearing element, respectively, by becoming embedded therein. Nor is there any need to provide specific complementary means in order for the washer crowns to enter into engagement with the screwable element and the bearing element, respectively. Thus, the locking washer according to the invention is suitable for being implemented with standard screwable elements.

Besides, it is noted that the washer crowns are designed for being deformed until they are flat, whereby it is possible to significantly reduce the length of the screw shanks compared to the ones used with more complex and thicker locking washers. Besides, since the washer crowns are maintained in their deformed, flattened state between the bearing element and the screwable element, the friction forces and hence the adhesion forces between the bearing support portions and the bearing element and the screwable element, respectively, are, for a given tension in the shank member, maximal which imparts an improved resistance to sliding. With regard to, more specifically, the friction coupling, it is thus a function of the friction forces and the distance at which they are applied relative to the axis of rotation. In case the locking washer having a shape of a truncated cone, was not deformed until flattened state, the friction coupling could hence be compensated for—at least partially—by an augmentation of the diameter of the washer and/or by providing expedient locking means. Owing to the invention, it is thus by no means necessary to increase the diameter of the locking washer in order for the bearing support portions of the washer crown in contact with, in particular, the bearing element to be further away from the axis of the screwable element in order to thereby increase precisely the friction coupling. Thus, the locking washers according to the invention require less material consumption and are hence more economical.

Besides, since the washer crowns are maintained deformed until flattened between the bearing element and the screwable element, it is also possible to limit the magnitude of mechanical stress in respect of the pre-tensioned threaded shank member which imparts a resistance to fatigue to it which is very considerably improved.

Advantageously, the asymmetrical radial teeth of the engagement faces of each of the washer crowns have an identical profile. This configuration enables an improved cooperation of the sliding sides against one another and consequently mitigates the friction forces between the engagement faces, which is particularly desired as will be explained in the following.

Besides, more preferably, each of the asymmetrical radial teeth has a stop side opposed to the sliding side relative to said crests, and the stop sides of said asymmetrical radial teeth of the engagement faces contact each other, respectively, when the engagement faces of said washer crowns are applied against each other. Thus, when the screwable element is screwed by force to be caused to hold the two washer crowns of the locking washer in a vise-grip, the latter are maintained rotatably locked due to the stop sides, and the screwable element is brought along in friction, sliding against the locking washer if the latter stays engaged with the bearing element. Obviously, if it enters into engagement with the screwable element, it is, itself, brought along in friction, sliding against the bearing element.

Preferably, the stop sides and the sliding sides join along an intersection line that extends radially. Also, the engagement faces of the washer crowns cooperate perfectly to the effect that there is no free space between the two crowns applied against each other. In this way, a locking washer is obtained that is self-contained and hence resistant to compression forces.

According to a particularly preferred embodiment of the invention, the washer crowns have axial planes intersecting the asymmetrical radial teeth along said crest, wherein the stop sides are substantially inclined relative to said axial planes; for instance by some degrees. In this manner, with the stop sides of one of the washer crowns coming into abutment on the stop sides of the other washer crown, there is no risk whatsoever that the stop sides slide against each other during the tightening of the screwable element. During this operation, the washer crowns thus remain joined in rotation to each other.

Besides, said washer crowns having axial planes intersecting the asymmetrical radial teeth along said crest and the perpendicular planes intersecting said axial planes perpendicularly along said crests, the sliding sides are advantageously substantially inclined relative to the perpendicular planes. For instance by some degrees and at an angle larger than the helix angle of the screwable element taken within the same frame of reference.

Besides, the engagement face of each of said washer crowns has between eight and thirty asymmetrical radial teeth. For certain uses, the washer crowns have between ten and twenty asymmetrical radial teeth. It may e.g. have fifteen of them. Thus, the axial movement of the two crowns relative to each other is ensured to perfection, and the forces are well distributed in the contour of the washer crowns, their thickness taken into consideration. Besides, one of said washer crowns has a convex engagement face, while the other one of the washer crowns has a concave engagement face. Thus, the washer crown having the convex engagement face is engaged with the washer crown having the concave engagement face. In this manner, the locking washer is constituted of two washer crowns engaged with each other while forming one single conical element, prior to being deformed until flattened. Also, the radial teeth of the washer crowns cooperate with each other, respectively, in such a manner that the sliding sides of the teeth are in contact with each other, respectively, before the two crowns are deformed until flattened. By such characteristic feature it is possible to avoid the movement of the crowns relative to each other during the tightening of the screwable element, and consequently the movement of the teeth of one of the washer crowns relative to the teeth of the other one of the washer crowns.

Advantageously the engagement faces are suitable for coming into continuous contact throughout their entire surface which enables the washer crowns to be kept in a mating relationship while enabling the implementation of e.g. an adhesive on the engagement faces. Such characteristic feature also facilitates the implementation of conditioning.

Besides, according to a particularly preferred embodiment, the washer crowns are preferably made of a spring steel; for instance a silicon steel. Also, the engagement faces are treated to reduce the friction forces between the sliding sides. By the treatment of the engagement faces is understood, herein, both a physical or a chemical treatment and the implementation of a coating. In addition, the bearing support portions opposite the engagement faces of the washer crowns are advantageously treated or coated to increase the friction forces between them and the nut and the bearing element, respectively. In this way it is further enabled to obviate radial striations on the bearing support points of the washer crowns that will have a propensity to damage the bearing element by becoming embedded therein.

Other characteristic features and advantages of the invention will become apparent by reading of the following description of a particular embodiment of the invention, given as a non-limiting example with reference to the accompanying drawing, wherein.

Figure 1:
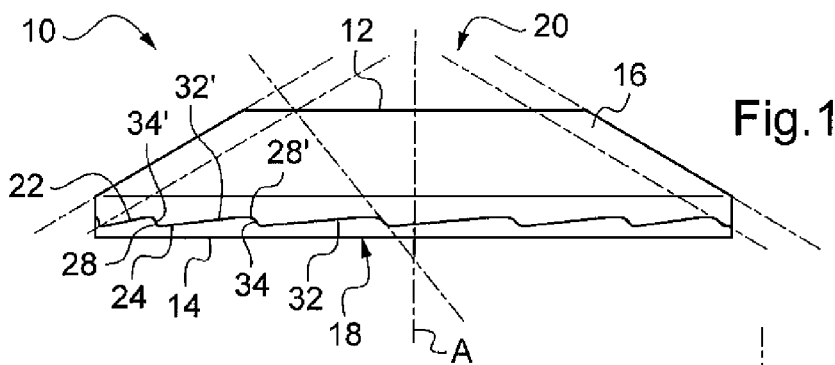
FIG. 1 is a schematic sectional view of the locking washer according to the invention.

FIG. 1 illustrates, in a sectional view, a truncated cone locking washer 10 having an axis of symmetry A. It has an external washer crown 12 and, interiorly, an internal washer crown 14. The two crowns 12, 14 are engaged with each other as will be explained in further detail in the following. The external washer crown 12 has an external bearing support portion 16 and an internal bearing support portion 18, masked in FIG. 1, while the locking washer 10 has a circular central opening 20 allowing engagement with e.g. a threaded shank element.

Figure 2:
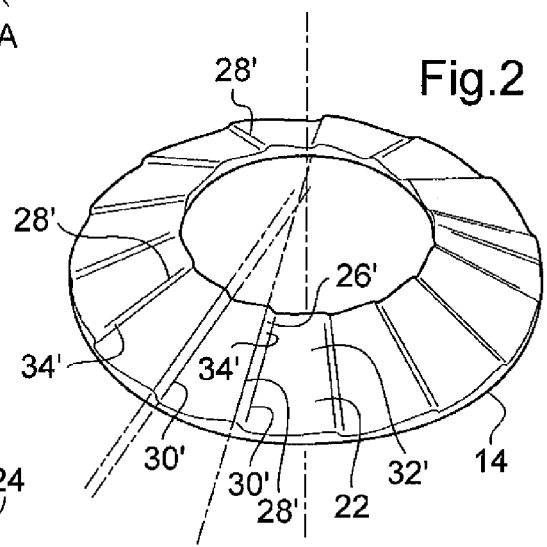
FIG. 2 is a schematic perspective view of an element of the locking washer shown in FIG. 1.
Figure 3:
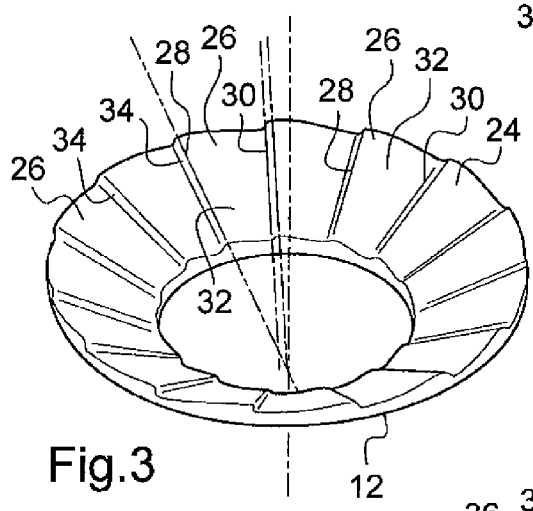
FIG. 3 is a schematic perspective view of another element of the locking washer shown in FIG. 1.

Reference is now alternatively made to FIGS. 2 and 3. In FIG. 2, the internal washer crown 14 is shown in a perspective view, seen from above, while, in FIG. 2, the external washer crown 12 will appear in a view seen from below. The external washer crown 12 defines a first middle cone, while the internal washer crown 14 defines a second middle cone. The internal washer crown 14 has a convex engagement face 22, while the external washer crown 12 has a concave engagement face 24. The two engagement faces 22, 24 are complementary and are adapted for engagement with each other without leaving any free space between the two crowns 14, 12. Advantageously, the two crowns 12, 14 are made of spring steel in order to be elastically deformable in an axial direction, between a conical state and a flattened state. Preferably the crowns 12, 14 are hot-forged and then deburred to subsequently undergo a thermal treatment suitable for homogenizing their mechanical properties. They may also be coated in certain circumstances.

Regarding the concave engagement face 24 of the external washer crown 12 shown in FIG. 3, it has 15 first asymmetrical radial teeth 26 distributed regularly in the circumference of the washer crown. Each of these first asymmetrical radial teeth 26 has a first crest 28 that extends radially and a first tooth bottom 30 separated angularly, substantially by 24°, from the first crest 28, and which also extends radially. Each of the first asymmetrical radial teeth 26 thus has, on the one hand, a first sliding side 32 which extends angularly in an inclined manner between the first crest 28 and the first tooth bottom 30. The first sliding side 32 of each of the first asymmetrical radial teeth 26 intersects the first middle cone defined above, while forming an angle of some degrees relative to the level of the section line, e.g. 5°. The first asymmetrical radial teeth 26 have, on the other hand, a first stop side 34 that extends opposite to the first sliding side 32 relative to the first crest 28 and which joins the first tooth bottom 30 of the following first asymmetrical radial tooth 26. In turn, the first stop side 34 intersects the first middle cone while forming a neighbouring angle of e.g. 90°, 95° plus or minus 10°, relative to the level of the section line. Also, the first stop side 34 extends angularly between the first crest 28 and the first tooth bottom 30 of the following first asymmetrical radial tooth 26, according to the first middle cone defined above, at some degrees only, e.g. two degrees.

Now reference is made to FIG. 2, wherein the convex engagement face 22 of the internal washer crown 14 has a shape which is complementary to the shape of the concave engagement face 24 of the external washer crown 12. Also, its analogue elements are indicated by the same reference provided with the prime symbol »'«. Thus, it has 15 second asymmetrical radial teeth 26' having the same profile as the first asymmetrical radial teeth 26, and distributed along the circumference. Each of the second teeth 26' has a second crest 28' which extends radially and a second tooth bottom 30' separated angularly by approximately 24° from the second crest 28'. Also each of the second asymmetrical radial teeth 26' has, on the one hand, a second sliding side 32' which extends angularly in an inclined manner between the second crest 28' and the second tooth bottom 30'. This second sliding side 32' of each of the second asymmetrical radial teeth 26' intersects the second middle cone defined above while forming an angle of some degrees relative to the level of the section line, e.g. 5°. The second asymmetrical radial teeth 26' have, on the other hand, a second stop side 34' which extends opposite the second sliding side 32' relative to the second crest 28' and which joins the second tooth bottom 30' of the following second asymmetrical radial tooth 26'. In turn, the second stop side 34' intersects the second middle cone while forming a neighbouring angle of 90° relative to the level of the section line. Also, the second stop side 34' extends angularly between the second crest 28' and the second tooth bottom 30' of the following second asymmetrical radial tooth 26', in accordance with the second middle cone defined above, at some degrees only, e.g. 2 degrees.

Thus, the external washer crown 12 and the internal washer crown 14 are connected, the convex engagement face 22 against the concave engagement face 24 as shown in FIG. 1. Also the first and the second sliding side 32, 32' respectively rest against each other, while the first and the second stop sides 34, 34' respectively abut on each other. The two engagement faces 22, 24 being complementary when they are connected, no free space remains between the two crowns 12, 14. In turn, a lubricant is advantageously applied onto the engagement face 22, 24 to facilitate the movement of the sliding sides 32, 32' against each other as will be explained in the following.

Following connection of the external washer crown 12 and the internal washer crown 14, the convex engagement face 22 against the concave engagement face 24, and following engagement of the locking washer thus formed between a screwable element and a bearing element, the rotation of the screwable element brings about the axial deformation in phase of the two crowns 12, 14, while they are rotatably locked relative to each other due to the stop sides 34, 34' of the teeth being in abutment on each other, respectively. In this manner, the teeth 26, 26' of the two crowns 12, 14 stay engaged during the deformation. Also, the teeth 26, 26' are not damaged during the deformation to flat state of the locking washer.

Figure 4:
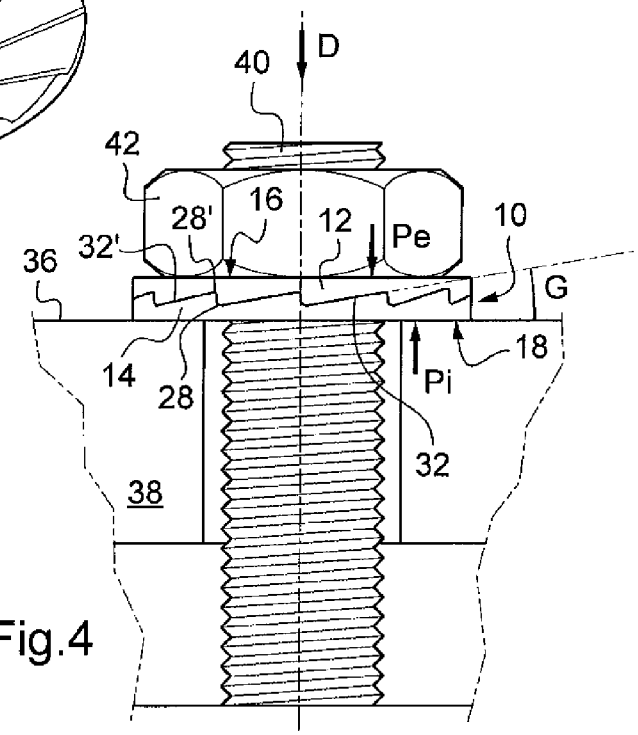
FIG. 4 is a schematic elevational side view of an assembly including the locking washer according to the invention in a working position.

The truncated cone locking washer 10 which will appear from FIG. 4 is flattened and it stays close-fitting against the bearing face 36 of a bearing element 38 and is traversed by a threaded shank member 40 to be held in a vise-grip between a nut 42 screwed onto the shank member 40. Thus, the external washer crown 12 as well as the internal washer crown 14 are flattened between the screwed and tightened nut 42 and the bearing face 36. Consequently the truncated cone locking washer 10 is compressed elastically between the nut 42 and the bearing face 36. It will appear that, seen from below along the arrow D, the nut 42 has been brought along in rotation in the clockwise direction in order to be able to rest on the external bearing support portion 16 of the external crown 12 and to deform elastically assembled the crowns 12, 14 forming the truncated cone locking washer 10 before flattening it.

After the tightening, the washer crowns 12, 14 applied against each other are maintained compressed under axial pressure between the nut 42 and the bearing face 36. The nut 42 thus exercises, on the external bearing support portion 16 of the external washer crown 12, a given external pressure Pe equivalent to the internal pressure Pi exercised by the bearing face 36 on the internal bearing support portion 18 of the internal crown 14. It is noted that this pressure is the result of both the tightening of the screw 42 and also, in particular, the elastic rebound of the truncated cone locking washer 10.

Thus, in this situation, when the screwed assembly illustrated in FIG. 4 is exposed to e.g. vibrations, the nut 42 will tend to loosen in the anticlockwise direction. In view of the pressures that are exerted between the bearing support portions 16, 18 and the nut 42 and the bearing face 36, respectively, when the nut 42 tends to loosen in the anticlockwise direction, the friction forces are so sizeable that the external washer crown 12 engages with the nut 42, while the internal washer crown 14 engages with the bearing face 36 with the result that the external washer 12 crown is brought along in rotation with the nut 42, while the internal washer crown 14 stays in fixed position. Also, the two crowns 12, 14 are separated axially from each other since the sliding faces 32 of the internal engagement face 24 are brought along slidingly against the sliding sides 32' of the external engagement face 22, while forming a ramp. This friction is facilitated by the lubricant. The angle G of the sliding flanges 32, 32', which corresponds to the angle of the largest slope relative to the median plane of the locking washer 10, being larger than the helix angle of the threaded shank member 40 relative to its straight section, the external washer crown 12 thus wedges during the rotation movement of the nut 42 and thereby blocks it immediately. Consequently the loosening of the nut 42 is rapidly interrupted.

In turn, when e.g. the threaded shank member 40 dilates under the influence of the temperature, or for any other reason, and the nut 42 and the bearing surface 36 of the bearing element 38 separate axially from each other, the truncated cone locking washer 10 then tends to revert to its initial truncated cone shape. In this manner, the external pressure Pe and the internal pressure Pi exercised on the one hand between the external bearing portion 16 of the external washer crown 12 and the nut 42, respectively, and between the bearing surface 36 and the internal bearing support portion 18, on the other hand, are preserved to a certain extent and remain substantially constant. In this way, the untimely loosening of the nut 42 will always provoke the bringing into rotation of the external washer crown 12 relative to the internal washer crown 14 and consequently the locking of the nut 42 against rotation due to the same forces as the ones mentioned above.

Obviously, such truncated cone locking washer 10 may also be adjusted between a screw head and any bearing support portion to bring about the same locking effects. Because, actually, it is the tension that is exerted in the screw shank which thus generates major friction in the screw/nut system and which brakes it when the one is brought into rotation relative to the other, Besides, it should be noted that the number of asymmetrical radial teeth is not limiting herein. Obviously, washer crowns comprising e.g. six teeth or even twenty teeth may also be completely suitable.

The invention claimed is:

1. Locking washer intended for being compressed axially between a bearing element and a screwable element, said screwable element being connected to said bearing element by a shank member suitable for traversing said locking washer, wherein said locking washer comprises two washer crowns having each an engagement face, said engagement face having a plurality of asymmetrical radial teeth, each of said radial asymmetrical teeth having, on the one hand, a crest and a tooth bottom spaced angularly from said crest, and, on the other hand, a sliding side inclined extending angularly between said crest and said tooth bottom, and wherein said engagement faces of said washer crowns are suitable for being applied against each other, whereas the sliding sides come into contact with each other, respectively, said washer crowns, which are applied against each other and maintained compressed under axial pressure between the screwable element and the bearing element, respectively, being suitable for being brought into rotation with the screwable element and the bearing element, respectively, when the screwable element loosens, with a view to bringing the washer crowns into rotation relative to each other, whereas the respective sliding sides are brought along slidingly against each other while forming a ramp to separate the washer crowns axially from each other to bring about the locking against rotation of the screwable element;

wherein the locking washer presents a shape of a truncated cone, each washer crown having the shape of a truncated cone with the engagement face of one of the washer crowns being on a concave side of the washer crown and the engagement face of the other washer crown being on a convex side of the washer crown; and in that said locking washer is elastically deformable in order to be able to be flattened, forming a spring between said bearing element and said screwable element to maintain said axial pressure substantially constant, whereby said washer crowns are suitable for being brought along in rotation relative to one another when said bearing element and said screwable element are separated axially from each other, wherein the two washer crowns when deformed to a flattened state between the screwable element and the bearing element have essentially the same diameter, wherein each crest and each tooth bottom have a rounded profile.

2. A locking washer according to claim 1, wherein the asymmetrical radial teeth of the engagement faces of each of the washer crowns have an identical profile.

3. A locking washer according to claim 1 wherein each of the asymmetrical radial teeth also has a stop side opposite said sliding face relative to said crests; and in that said stop sides of said asymmetrical radial teeth of said engagement faces come into contact with each other, respectively, when said engagement faces of said washer crowns are applied against each other.

4. A locking washer according to claim 3, wherein the stop sides and the sliding sides join along an intersection line that extends radially.

5. A locking washer according to claim 3, wherein said washer crowns have axial planes intersecting the asymmetrical radial teeth according to said crest, and the stop sides are substantially inclined relative to the axial planes.

6. A locking washer according to claim 1, wherein said washer crowns have axial planes intersecting the asymmetrical, radial teeth along said crest and perpendicular planes intersecting the axial planes perpendicularly according to said crest, and said sliding sides are substantially inclined relative to said perpendicular planes.

7. A locking washer according to claim 1, wherein the engagement face of each of said washer crowns has between ten and twenty asymmetrical radial teeth.

8. A locking washer according to claim 1, wherein the washer crowns have a convex engagement face, whereas the other one of the washer crowns has a concave engagement face.

9. A locking washer according to claim 1, wherein said washer crowns are made from a spring steel.

10. A locking washer according to claim 1, wherein said engagement faces are treated to reduce the friction forces between said sliding faces.

11. A locking washer according to claim 1, wherein the crests and tooth bottoms extend all the way from the inner diameter to the outer diameter of the washer crown.

* * * * *